Patented Sept. 20, 1932

1,878,986

UNITED STATES PATENT OFFICE

MAXIMILIAN PAUL SCHMIDT AND WILHELM NEUGEBAUER, OF BIEBRICH-ON-THE-RHINE, GERMANY, ASSIGNORS TO GENERAL ANILINE WORKS, INC., OF NEW YORK, N. Y., A CORPORATION OF DELAWARE

VAT DYESTUFFS OF THE POLYNUCLEAR AROMATIC IMIDAZOLE SERIES AND THE PROCESS OF PREPARING THEM

No Drawing. Application filed February 1, 1929, Serial No. 336,915, and in Germany December 27, 1922.

Our present invention relates to vat dyestuffs and process of preparing them.

We have found that compounds of the following constitution:

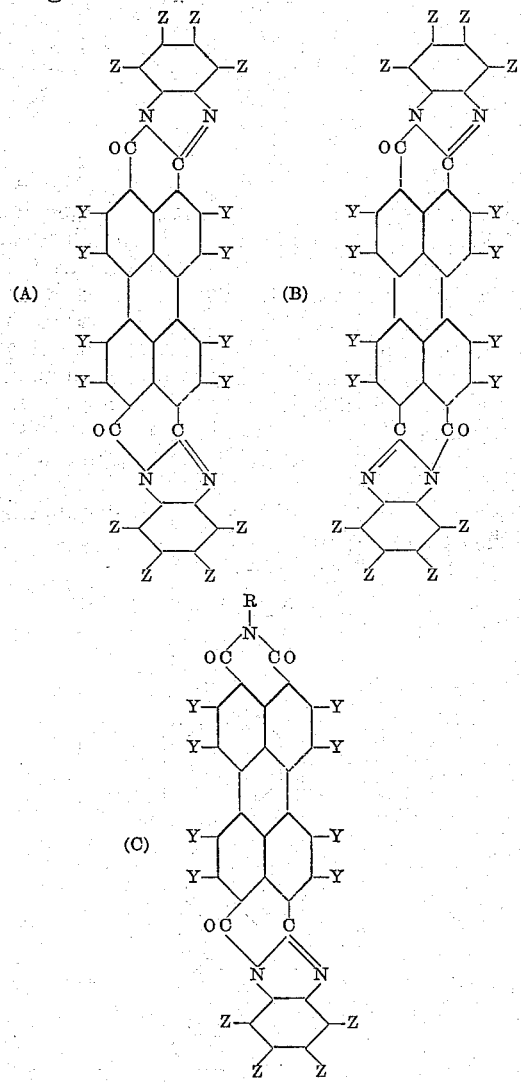

wherein at least one Y stands for a negative substituent, such as chlorine, bromine or the nitro group, and the remaining Y's for hydrogen, and Z stands for hydrogen or a monovalent substituent, such as chlorine can be caused to react with phenols, thiophenols, amines, alcohols, and mercaptans so as to form valuable vat dyestuffs.

The conversion can be effected by heating the components alone or in the presence of a solvent or a diluent. Acid-binding substances and also catalysts, such as for instance copper compounds, may be added.

The products of the above general formulæ (A—C) which are used as starting materials can be obtained by condensing with ortho-diamines negatively substituted perylene-3.-4.9.10-tetracarboxylic acids and their monoimides respectively, or by subsequently introducing negative substituents into the products obtainable by condensing perylene-3.4.9.10-tetracarboxylic acid or a monoimide thereof with ortho-diamines.

The following examples illustrate our invention, but they are not intended to limit it thereto. The parts are by weight:

1. 10 parts of the blue-violet vat dyestuff (obtainable by chlorinating in chlorosulfonic acid or fuming sulfuric acid the anhydride of perylenetetracarboxylic acid until 4 chlorine atoms have been taken up, and condensing the tetrachloro-compound with o-phenylene-diamine, for instance, in glacial acetic acid) having the following constitution:

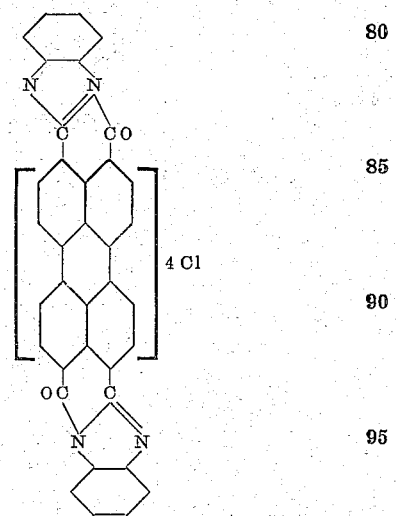

are heated to the boiling point for 9–10 hours with 100 parts of phenol and 10 parts of potassium hydroxide in a vessel provided with a stirrer and reflux condenser.

The reaction product may be isolated from the melt after the latter has been sufficiently cooled, for instance by means of dilute caustic soda solution which causes the phenol to dissolve. The mass is then filtered, washed and dried. The dyestuff, thus obtained in the form of a bluish-black powder, is soluble in concentrated sulfuric acid to a blue solution. The hydrosulfite vat is of a green color and dyes cotton fast blue tints. The parent dyestuff dyes bluish-violet tints.

In the present example cresol and other aromatic hydroxycompounds can be substituted for the phenol, the reaction taking place in an analogous manner; thiophenol or similar thiocompounds can also be used.

The final product has the following formula:

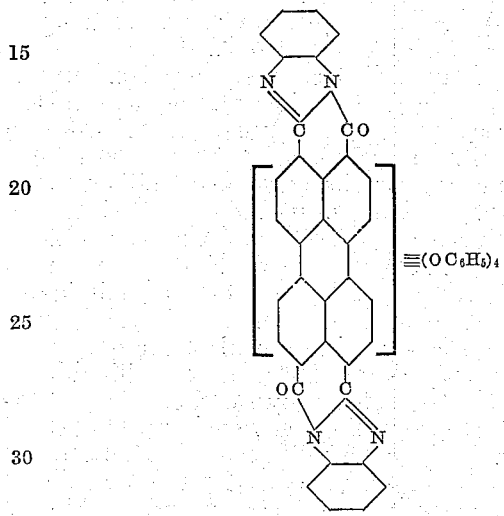

2. 10 parts of the violet vat dyestuff of the following formula:

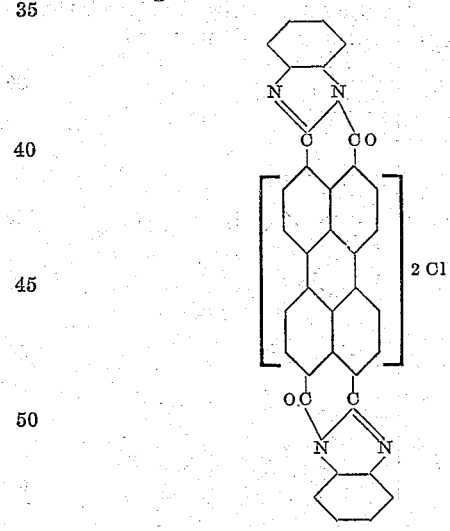

(obtainable by condensing dichlorperylene-3.4.9.10-tetracarboxylic acid anhydride with o-phenylenediamine) are heated to the boiling point with 100 parts of phenol and 10 parts of anhydrous potassium carbonate and boiling is continued for 20 hours while stirring. The working up of the melt can take place as described in Example 1. The bluish-black dyestuff-powder, thus obtained, is soluble in concentrated sulfuric acid to a blue solution and yields a violet-blue vat, dyeing cotton fast blue tints. The final product has the following formula:

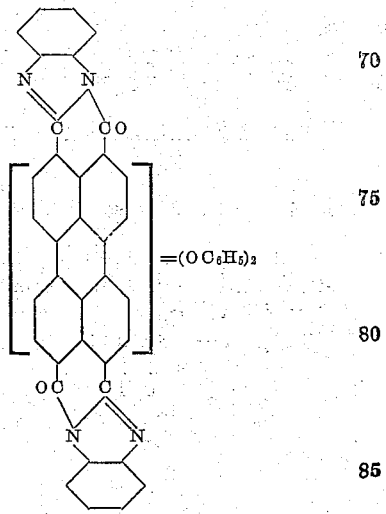

3. 10 parts of the dyestuff, obtainable by brominating the anhydride of perylene-3.4.9.10-tetracarboxylic acid in chlorosulfonic acid until 2 atoms of bromine are taken up and condensing the brominated acid with ortho-phenylenediamine, are heated to the boiling point with 100 parts of phenol and 10 parts of anhydrous potassium carbonate and boiling is continued for 10 hours while stirring. The melt can be worked up as described in Example 1. The dyestuff thus obtained is very similar to that obtainable according to Example 2. The product has the following formula:

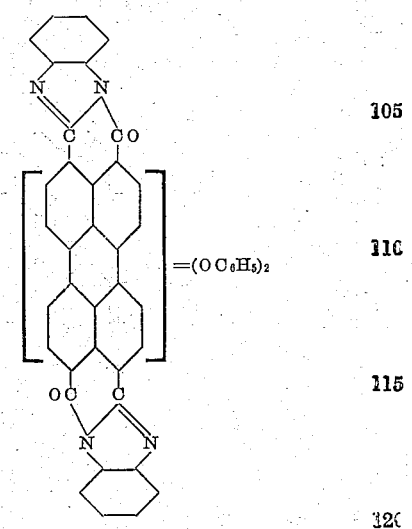

4. 5 parts of the dyestuff obtainable by condensing 4-chlorophenylenediamine-1.2 with the anhydride of dichloroperylene-3.4.9.10-tetracarboxylic acid (obtainable by chlorination in chlorosulfonic acid) are heated to the boiling point with 50 parts of phenol and 5 parts of potassium carbonate and boiling is continued for 12 hours. After the melt has been cooled, it is diluted with alcohol, filtered with suction and subsequently washed with alcohol and finally with water. The dyestuff thus obtained is a violet-black powder. It is soluble in concentrated sulfuric acid to a green solution. The hydrosulfite vat is reddish-blue. The dyestuff dyes cotton tints of a little more reddish hue than those obtainable according to Example 2. The final product has the following formula:

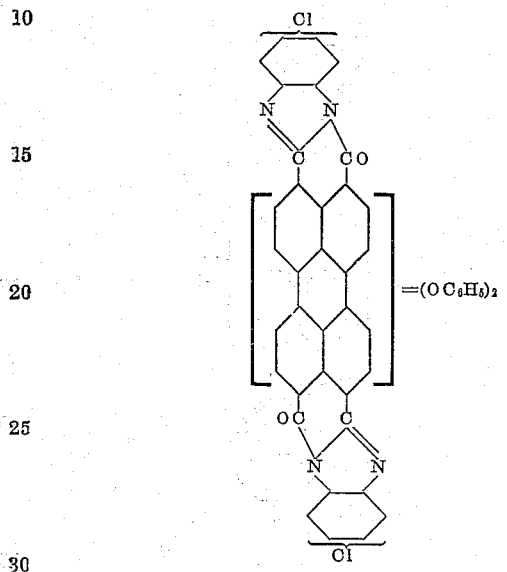

5. 10 parts of the dyestuff containing chlorine, which is used in Example 2, are heated to the boiling point with 100 parts of paratoluidine and 10 parts of sodium carbonate and boiling is continued for 30 hours while stirring. After the melt has been cooled, it is diluted with alcohol, filtered and subsequently washed with alcohol and with water. The dried dyestuff powder has a violet-black color, the hydrosulfite vat is blue and dyes cotton violet-blue tints. The final product has the following formula:

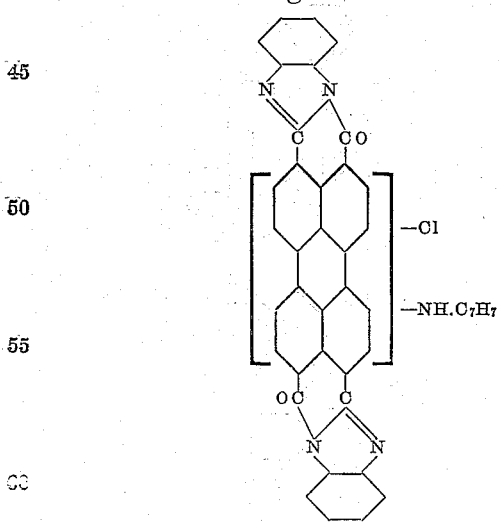

In the present example the para-toluidine can also be replaced by other amines whereby valuable vat dyestuffs are likewise obtained.

This application contains subject matter in common with our application Ser. No. 681,273 filed on December 17, 1923, which matured into Patent No. 1,715,430, dated June 4, 1929.

The following claims are not intended to comprise anything which has been claimed in our co-pending application Ser. No. 681,273.

We claim:

1. The process for producing vat dyestuffs consisting in condensing a compound of the following general formula:

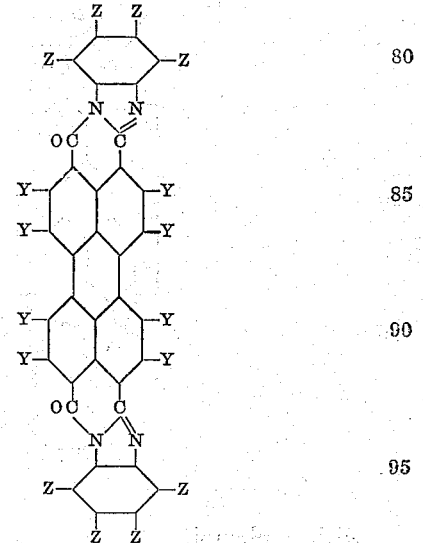

wherein at least one Y stands for chlorine, bromine or the nitro group and the remaining Y's for hydrogen, and one Z stands for chlorine and the other Z's for hydrogen with compounds of the general formula:

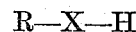

wherein X represents O, S or NH and R stands for an alkyl or aryl group.

2. The process of producing vat dyestuffs consisting in condensing a compound of the following general formula:

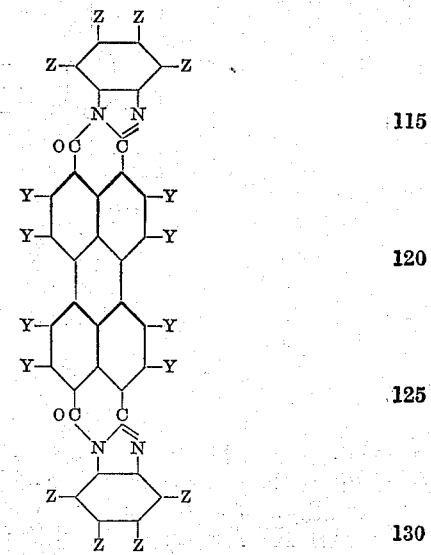

wherein at least one Y stands for chlorine, bromine or the nitro group and the remaining Y's for hydrogen, and one Z stands for chlorine and the other Z's for hydrogen with a phenol.

3. The process of producing vat dyestuffs consisting in condensing a compound of the following formula:

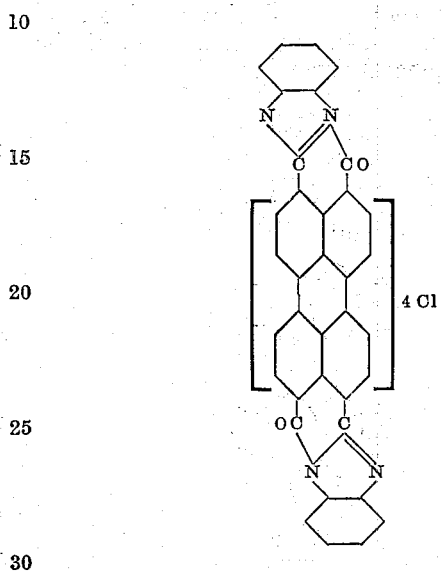

with a phenol.

4. As new products the vat dyestuffs of the following formula:

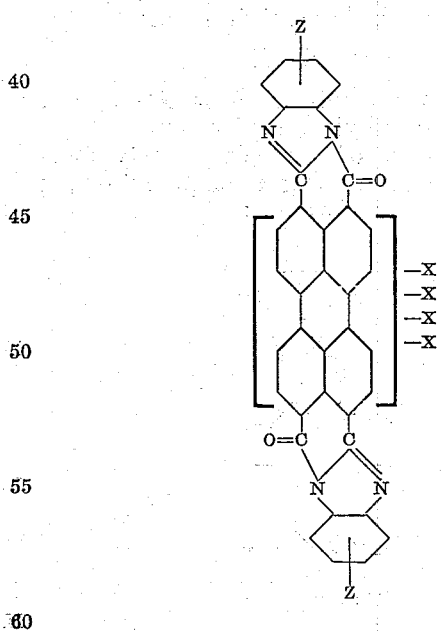

wherein at least one X stands for a substituent of the group consisting of $NH_2$, NH-aryl, O-alkyl, O-aryl, S-alkyl and S-aryl and the other X's for hydrogen, chlorine, bromine or a nitro group, and Z stands for hydrogen or chlorine, being bluish-black powders, soluble in concentrated sulfuric acid to green or blue solutions.

5. As new products the vat dyestuffs of the following formula:

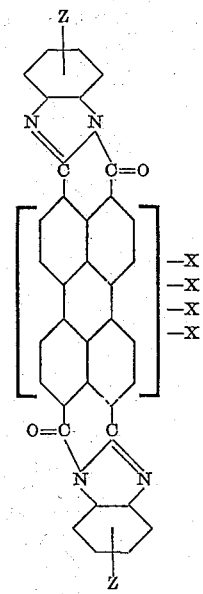

wherein two X's stand for O-aryl and the other X's for O-aryl or hydrogen, Z for chlorine or hydrogen, being bluish black powders, soluble in concentrated sulfuric acid to green or blue solutions.

6. As new products, the vat dyestuffs of the following formula:

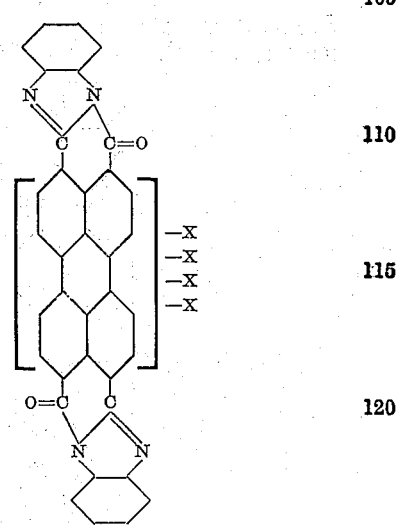

wherein two X's stand for O-aryl and the other X's for O-aryl or hydrogen, being bluish-black powders, soluble in concentrated sulfuric acid to green or blue solutions.

7. As new products, the vat dyestuffs of the following formula:

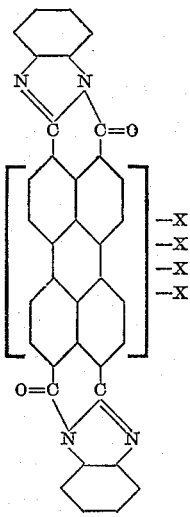

wherein two X's stand for $O.C_6H_5$ and the other two X's for $O.C_6H_5$ or hydrogen being bluish-black powders, soluble in concentrated sulfuric acid to green or blue solutions.

8. As a new product, the vat dyestuff of the following formula:

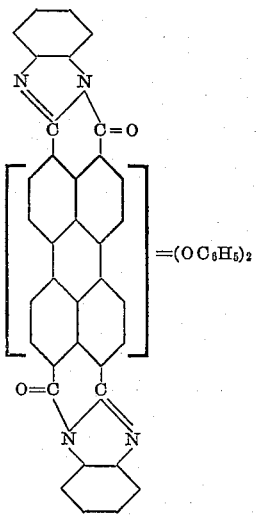

being a bluish-black powder, soluble in concentrated sulfuric acid to a blue solution.

9. As a new product, the vat dyestuff of the following formula:

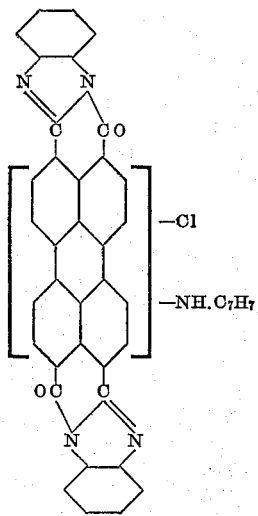

being a violet-black powder.

10. As a new product, the vat dyestuff of the following formula:

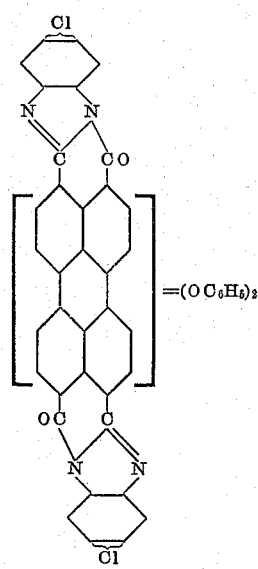

being a violet-black powder, soluble in concentrated sulfuric acid to a green solution.

In testimony whereof, we affix our signatures.

MAXIMILIAN PAUL SCHMIDT.
WILHELM NEUGEBAUER.